United States Patent [19]
Menon et al.

[11] Patent Number: 5,908,804
[45] Date of Patent: *Jun. 1, 1999

[54] REDUCTION OF EMISSIONS FROM FCC REGENERATORS

[75] Inventors: Raghu K. Menon, Medford; Ramakrishnan Ramachandran, Allendale, both of N.J.

[73] Assignee: The BOC Group, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,330

[22] Filed: Sep. 5, 1997

Related U.S. Application Data

[63] Continuation of application No. 08/315,656, Sep. 30, 1994, abandoned.

[51] Int. Cl.[6] .................................................. B01J 20/34
[52] U.S. Cl. .................. 502/38; 502/39; 502/41; 502/42; 502/52; 208/113; 208/120
[58] Field of Search ................... 502/38, 39, 41, 502/42, 52; 208/113, 120

[56] References Cited

U.S. PATENT DOCUMENTS

| | | | |
|---|---|---|---|
| 2,985,584 | 5/1961 | Rabo et al. | 208/120 |
| 4,443,551 | 4/1984 | Lionetti et al. | 502/41 |
| 4,542,114 | 9/1985 | Hegarty | 502/39 |

OTHER PUBLICATIONS

Avidan et al. "Development of Catalytic Cracking Technology. A Lesson in Chemical Reactor Design." Ind. Eng. Chem. Res. (1990) 29, 931–942. (Month not available).

*Primary Examiner*—Shrive Beck
*Assistant Examiner*—Timothy Meeks
*Attorney, Agent, or Firm*—Coleman R. Reap; Salvatore P. Pace

[57] ABSTRACT

Coke is burned in the regenerator vessel of an FCC complex with a combustion medium consisting of a diluent gas, such as air, enriched with oxygen, The regenerator is operated in partial combustion mode and excess oxygen is introduced into the combustion zone of the regenerator. Emission of nitrogen oxides to the atmosphere is reduced.

18 Claims, 2 Drawing Sheets

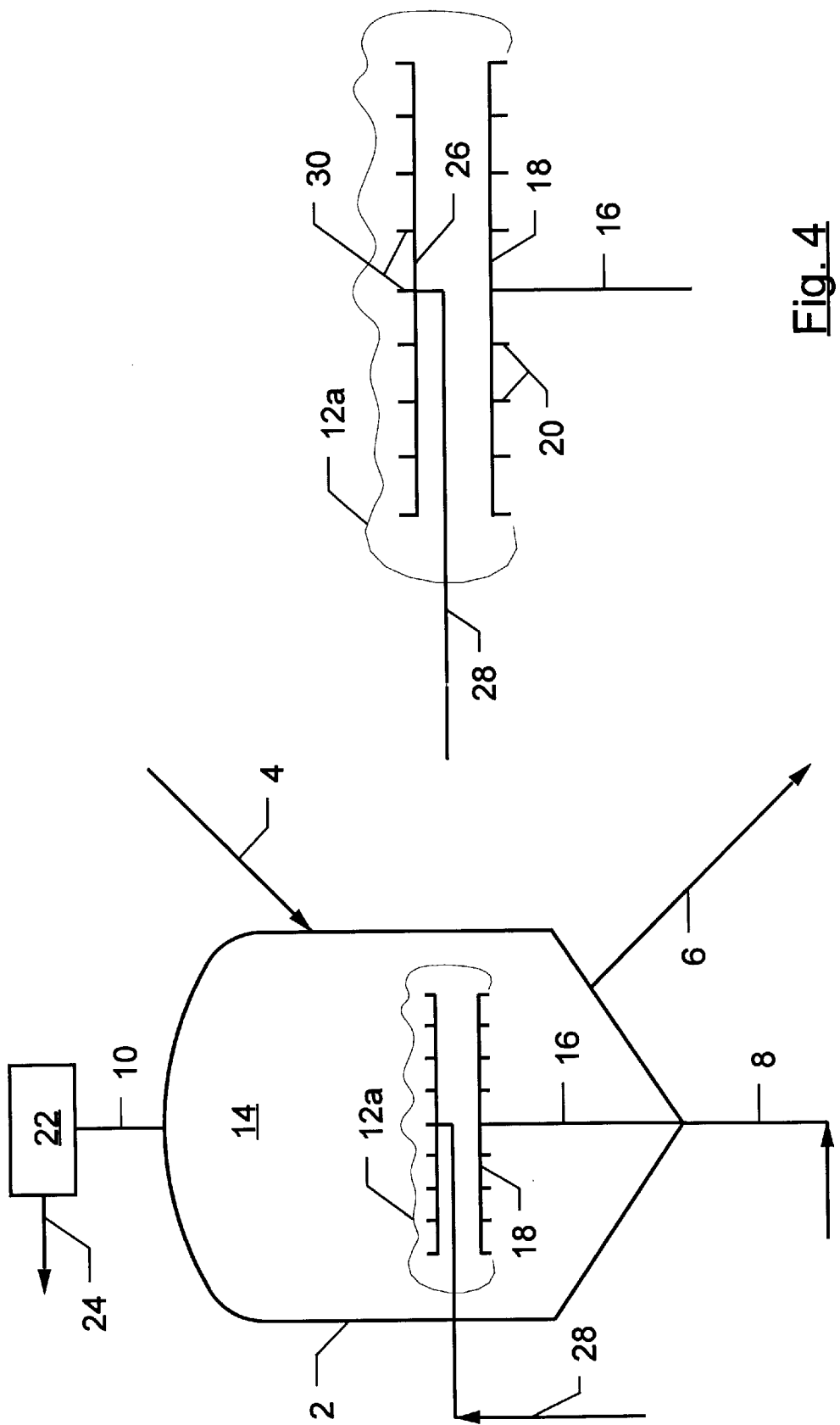

REDUCTION OF EMISSIONS FROM FCC REGENERATORS

This is a continuation of application Ser. No. 08/315,656 filed Sep. 30, 1994, now abandoned.

FIELD OF THE INVENTION

This invention relates to a method of reducing $NO_x$ from exhaust gases, and particularly to the reduction of $NO_x$ in exhaust gases from catalytic cracking unit regenerators.

BACKGROUND OF THE INVENTION

In catalytic cracking processes hydrocarbon feedstock is injected into the riser section of a hydrocarbon cracking reactor, where it cracks into lighter, valuable products on contacting hot catalyst circulated to the riser-reactor from a catalyst regenerator vessel. As the endothermic cracking reactions take place, the catalyst gets covered with coke deposits. The catalyst and hydrocarbon vapors are carried up the riser to the disengagement section of the reactor, where they are separated. Subsequently, the catalyst flows into the stripping section, where the hydrocarbon vapors entrained with the catalyst are stripped by steam injection, and the stripped catalyst flows through a spent catalyst standpipe and into the catalyst regenerator vessel.

Typically, the catalyst is regenerated by introducing air into the regenerator vessel to burn coke off the catalyst, thereby rejuvenating it. The coke combustion reactions are highly exothermic and heat the catalyst. The hot, reactivated catalyst flows through the regenerated catalyst standpipe back to the riser to complete the catalyst cycle. The coke combustion exhaust gas stream rises to the top of the regenerator and leaves the regenerator through the regenerator flue. The exhaust gas contains nitrogen and carbon dioxide ($CO_2$), and generally also contains carbon monoxide (CO), oxygen, sulfur oxides ($SO_x$), nitrogen oxides ($NO_x$) and reduced nitrogen species, such as ammonia.

The catalyst regenerator may be operated in complete combustion mode, which has now become the standard combustion mode, or in partial CO combustion mode. In complete combustion operation, the coke on the catalyst is completely burned to $CO_2$. This is typically accomplished by conducting the regeneration in the presence of excess oxygen, provided in the form of excess air. The exhaust gas from complete combustion operations comprises primarily $CO_2$, nitrogen and excess oxygen, but also contains $NO_x$ and $SO_x$.

In partial carbon monoxide combustion mode operation, the catalyst regenerator is operated with insufficient air to burn all of the coke in the catalyst to $CO_2$, consequently the coke is combusted to a mixture of CO and $CO_2$. The CO is oxidized to $CO_2$ in a downstream CO boiler. The effluent from the CO boiler comprises primarily $CO_2$ and nitrogen, but also contains $NO_x$ and $SO_x$.

Recently, there has been considerable concern about the amount of $NO_x$ and $SO_x$ being released to the environment in refinery flue gases. It is now the accepted view that most of the $NO_x$ present in catalyst regenerator exhaust comes from coke nitrogen, i.e. nitrogen contained in the coke in the form of heterocompounds such as condensed cyclic compounds, and that little or none of the $NO_x$ contained in the exhaust gas is derived from the nitrogen contained in the air feed to the regenerator. The mechanism by which the coke nitrogen ends up as $NO_x$ differs, depending on whether the regenerator is operated in complete combustion mode or in partial combustion mode. In complete combustion mode regenerator operation, coke nitrogen is converted to a mixture of $NO_x$ and elemental nitrogen. In this operational mode, the amount of $NO_x$ in catalyst regenerator flue gas tends to increase as the excess oxygen concentration from the regenerator increases.

When the regenerator is operated in partial CO combustion mode, very little $NO_x$ is produced in the regenerator, and coke nitrogen leaves the regenerator as reduced nitrogen species, such as ammonia. The reduced nitrogen species are unstable in the CO boiler, and they are easily converted to $NO_x$ and elemental nitrogen.

Several approaches have been used in industry to reduce $NO_x$ in cracking catalyst regenerator exhaust gases. These include capital-intensive and expensive options, such as pretreatment of reactor feed with hydrogen and flue gas post-treatment options; intermediate cost options, such as split-feed injection to the hydrocarbon reactor, and less expensive options, such as the use of catalysts and catalyst additives.

Efforts to reduce $NO_x$ from boiler stacks downstream of FCC units operated in partial combustion mode are centered on the reduction of ammonia and other $NO_x$ precursors in regenerator flue gas. U.S. Pat. No. 4,755,282 discloses the use of a noble metal on an inorganic support to reduce the ammonia content of flue gas from regenerators. U.S. Pat. No. 4,744,962 teaches the addition of $NO_x$ either to the regenerator or to the downstream flue gas line. U.S. Pat. No. 5,021,144 teaches the reduction of ammonia from a regenerator operated in partial CO combustion, by the addition of excess amounts of CO promoter.

U.S. Pat. No. 5,268,089 teaches that $NO_x$ can be reduced by regenerator operation "on the brink", i.e. in a region between conventional partial CO combustion operation and complete combustion operation with less than 0.05 mol % excess CO. The patent indicates that by operating in this mode, the reduced nitrogen species, such as ammonia, which are formed in partial CO combustion operation, are oxidized to nitrogen oxides and elemental nitrogen, and because of the prevailing reducing environment in the regenerator, the nitrogen oxides are reduced to elemental nitrogen prior to leaving the regenerator. Drawbacks associated with operating in the above-described mode are the existence of very high regenerator temperatures and afterburn, in addition to the difficulties associated with regenerator controllability.

Several patents disclose the reduction of $NO_x$ in FCC regenerators by means of promoters, segregated feed cracking, post treatment of exhaust gas, etc. These patents are discussed in detail in U.S. Pat. No. 5,268,089, the disclosure of which is incorporated herein by reference.

Because of considerable pressure from environmentalists and others to avoid polluting the atmosphere with noxious gases, efforts are continuously underway to find new and improved methods of reducing the concentration of $NO_x$ and $SO_x$ in industrial flue gases, such as FCC regenerator exhaust gases. This invention provides a method of taking advantage of the peculiar nitrogen chemistry in partial CO combustion to reduce the amount of effluent $NO_x$ by enriching selected zones in the regenerator with oxygen.

SUMMARY OF THE INVENTION

The invention is carried out by regenerating a coked hydrocarbon processing catalyst by burning most of the coke off the catalyst under partial combustion conditions in a highly oxidizing zone, thereby converting at least part of the coke nitrogen to nitrogen oxides, and then converting the nitrogen oxides to elemental nitrogen by passing them through a highly reducing zone.

According to a first and more generalized embodiment, coked catalyst from a hydrocarbon processing unit is contacted in a combustion zone with an oxygen-inert gas mixture in which the oxygen concentration is at least about 24% by volume at a temperature at which most of the coke burns to a mixture of carbon monoxide and carbon dioxide, thereby substantially oxidizing the reduced nitrogen species that comes from the coke to nitrogen oxides. The total amount of oxygen in the combustion zone is such that the combustion gas leaving the combustion zone contains at least about 1% by volume carbon monoxide. The combustion gas from the combustion zone passes through a reducing zone where the nitrogen oxides are converted to elemental nitrogen.

The gases entering the combustion zone include oxygen and one or more inert gases, such as nitrogen, argon, carbon dioxide or mixtures of these. Typical feed gas mixtures entering the combustion include air, oxygen-enriched air, oxygen-carbon dioxide mixture, oxygen-argon mixture and oxygen-enriched air-carbon monoxide mixture. Preferred gas mixtures include oxygen-enriched air and oxygen-carbon dioxide gas mixture in which the oxygen content is at least about 25.5% by volume. The maximum concentration of oxygen entering the combustion zone is generally such that the average temperature prevailing in the combustion zone is in the range of about 650 to about 815° C., and is preferably such that the average temperature in the combustion zone is in the range of about 670 to about 790° C.

The process is particularly useful for regenerating a hydrocarbon cracking catalyst, especially a hydrocarbon cracking catalyst which is in the form of a fluidized bed.

In a preferred form of the invention the combustion zone and the reducing zone are each situated within a catalyst regeneration vessel. Most preferably, the combustion zone is located in the lower part of the regeneration vessel and the reducing zone is located in the upper part of the regeneration vessel, i.e. above the combustion zone.

In one embodiment of the invention the gases entering the combustion zone are combined before they enter the combustion zone. In another and more preferred embodiment, the gases are introduced into the combustion zone in two or more streams. In the latter embodiment, the first gas, comprising oxygen and an inert gas is introduced into the lower part of the combustion zone, and a second gas, comprising oxygen or an oxygen-inert gas mixture is introduced into the portion of the combustion zone downstream of the point of entry of the first gas. In a most preferred aspect of the second embodiment, the first gas is air, oxygen-enriched air or oxygen-carbon dioxide gas mixture, and the second gas is oxygen-enriched air or high purity oxygen.

As noted above, the amount of oxygen introduced into the combustion zone is such that the combustion gas contains at least about 1% carbon monoxide. The amount of oxygen is preferably such that the combustion gas contains at least about 3% carbon monoxide, and most preferably limited to the extent the combustion gas contains at least 3.5% carbon monoxide.

In a preferred embodiment of the invention, the regeneration process comprises a part of an FCC operation in which hot regenerated catalyst is transferred from the catalyst regeneration vessel to a hydrocarbon cracking reactor, where it contacts fresh hydrocarbon and cracks the hydrocarbon into lower molecular weight hydrocarbons, and in the process, becomes coated with coke. The coked catalyst is then separated from the cracked hydrocarbons and returned to the regenerator for rejuvenation.

In an apparatus embodiment, the invention comprises a fluidized bed catalyst regenerator having a combustion zone and a reducing zone and two or more conduit means for introducing oxygen-containing gas into the combustion zone. In a preferred embodiment one of the conduit means is located in the bottom region of the combustion zone and a second conduit means is located above the first conduit means, preferably near the top of the combustion zone.

In a preferred aspect of the apparatus embodiment, the system includes a means for combusting carbon monoxide contained in the combustion flue gas to carbon dioxide.

BRIEF DESCRIPTION OF THE DRAWINGS

FIG. 3 is a cross sectional view of the catalyst regeneration vessel of FIG. 1 illustrating a preferred embodiment of the invention.

FIG. 4 is an enlarged view of the combustion zone illustrated in FIG. 3.

DETAILED DESCRIPTION OF THE INVENTION

Figure 2:
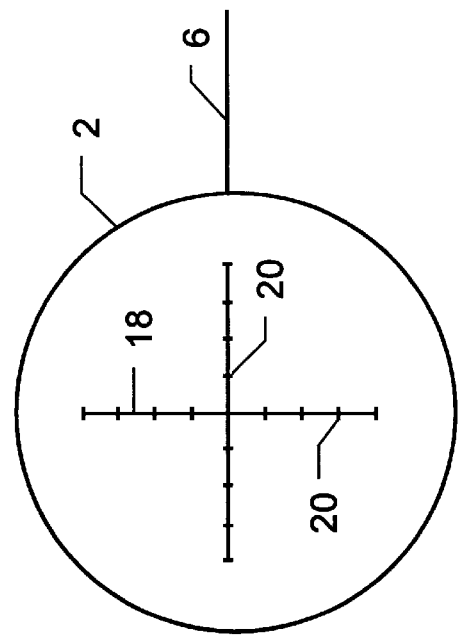
FIG. 2 is a view of the oxygen-containing gas assembly taken along the line II—II of FIG. 1.

This invention provides a method of considerably reducing nitrogen oxide emissions from FCC catalyst regeneration units. The coke present on the catalyst is burned in a combustion zone of the regenerator with an oxygen-inert gas mixture in which the oxygen is at a higher concentration than its normal concentration in air, i.e. about 20.9% by volume. This environment reduces the amount of coke nitrogen that is converted to reduced nitrogen compounds, such as ammonia, and increases the amount of nitrogen oxides that are produced in the combustion zone from the coke nitrogen. The total amount of oxygen in the combustion zone is limited so that the regenerator is operated in partial combustion mode; consequently the exhaust gases leaving the combustion zone contain enough carbon monoxide to create a reducing zone downstream of the combustion zone. The result is that the nitrogen oxides are reduced to harmless elemental nitrogen.

The presence of the reducing environment downstream from the combustion zone is important for successful operation of the invention. Thus, the invention will only result in a reduction of nitrogen oxides in the combustion gas when the regenerator is operated in partial combustion mode with at least 1% carbon monoxide present in the exhaust gas leaving the combustion zone of the regenerator. Furthermore, to effect substantial conversion of reduced nitrogen species in the coke to nitrogen oxides in the local "enriched" oxygen zone, i.e. the combustion zone, it is necessary that the oxygen level in the combustion zone be at least 24 mol %, and preferably 25.5 mol % of the total gas entering this zone.

To enhance the sequential conversion of a portion of the reduced nitrogen species to nitrogen oxides and nitrogen, and the simultaneous reduction of the formed nitrogen oxides to elemental nitrogen, the regenerator should be operated in the temperature range of about 650 to about 815° C., and preferably in the range of about 670 to about 790° C. In a preferred embodiment of the invention the supplemental oxygen will be introduced into the bed at an elevation slightly above the main combustion gas distribution system. This ensures maximum selectivity for the conversion of reduced nitrogen species to nitrogen oxides, which will be ultimately reduced before the gas leaves a regenerator vessel operated in the mode specified above.

Operating in partial CO combustion mode, with large amounts of enriched oxygen runs counter-directional to the temperature minimization perspective. It is well established that nitrogen oxides levels tend to increase with increasing excess oxygen level for "standard" (complete combustion) operation. Enriching a regenerator with oxygen, to reduce nitrogen oxides might thus appear counter-intuitive. However, this logic is not directly transferable to partial CO combustion operation, where the downstream boiler is the principal source of nitrogen oxides. It is not believed that using enriched air for a single-stage regenerator operated in complete combustion mode will lower regenerator nitrogen oxides emissions.

The presence of higher levels of oxygen in the regenerator is also expected to enhance the effectiveness of de-$SO_x$ additives, which pick up $SO_x$ as $SO_3$ and not $SO_2$ in the regenerator. The increasing level of $SO_x$ removal in the regenerator will result in a higher amount of hydrogen sulfide discharged by the catalyst along with reactor products, which can be recovered by several well-known processes.

The appended figures illustrate FCC system catalyst regenerators equipped to handle each of the above-discussed embodiments of the invention. Various flow lines have been included in the figures as an aid to the explanation of the several aspects of the invention. The hydrocarbon cracking reactor and associated processing equipment, valves, gages, etc., that are not directly related to the invention and which are not necessary for an understanding of the invention have been omitted from the drawings for the sake of simplicity. The same reference numerals have been used to represent the same or similar parts in the various drawings.

Figure 1:
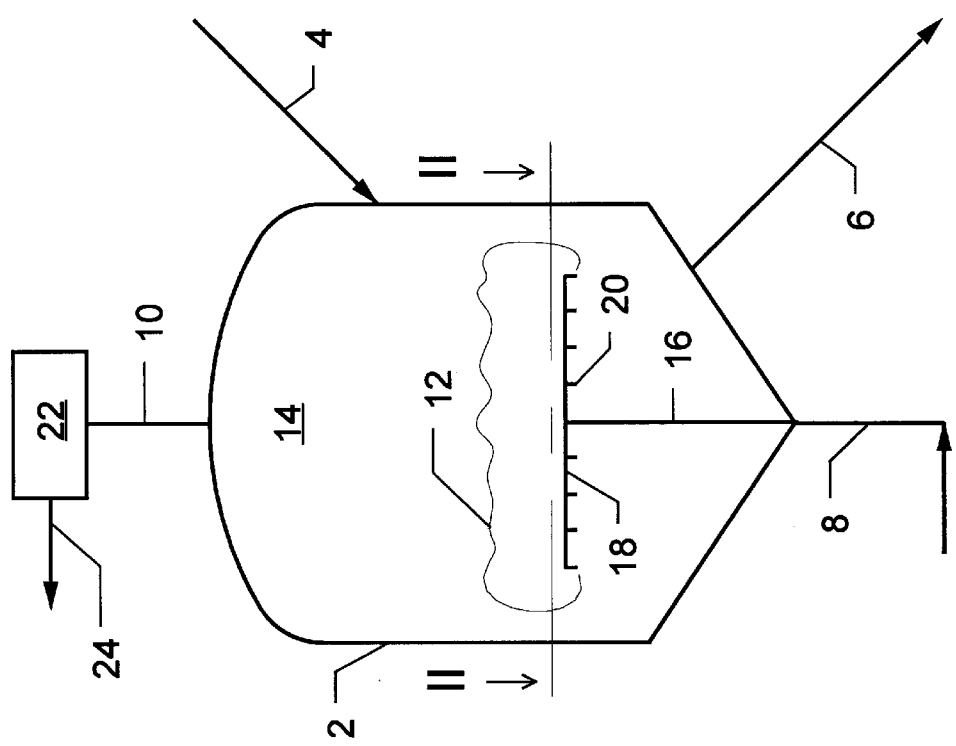
FIG. 1 is a cross sectional view of a catalyst regeneration vessel of an FCC plant illustrating one embodiment of the invention.

Turning now to the embodiment illustrated in FIGS. 1 and 2, hydrocarbon cracking catalyst regenerator 2 is provided externally with spent catalyst transport line 4, regenerated catalyst transport line 6, oxygen-containing gas supply line 8, exhaust gas line 10. A combustion zone, designated generally as 12, and a reducing zone, designated generally as 14, are located in the lower and upper regions, respectively, of the interior of regenerator 2. Feed line 16 connects supply line 8 to the center of gas distributor 18. Distributor 18 is provided with nozzles 20. In the embodiment illustrated in the drawings, distributor 18 is comprised of two perpendicular arms disposed horizontally in the lower part of regenerator 2; however, distributor 18 can have any desired configuration, such as a circular ring extending around the periphery of vessel 2.

Combustion zone 12 is area within regenerator 2 where combustion of the coke takes place. Since combustion is effected by contact of the oxygen with the hot coke, combustion zone 18 is defined by the oxygen entering regenerator 2. In the design depicted in FIG. 1, nozzles 20 are disposed downwardly to direct the flow of oxygen-containing gas below distributor 18, and thus enlarge combustion zone 12.

Exhaust gas line 10 connects the upper region of regenerator 2 with an optional carbon monoxide boiler 22. Boiler 22 is provided on its outlet end with vent line 24. In cases where carbon monoxide boiler 22 is not used, the carbon monoxide-containing exhaust gas is transferred to downstream operations for further treatment, such as shift reaction.

In the process practiced in the system illustrated in FIGS. 1 and 2, spent hydrocarbon cracking catalyst is transferred from a hydrocarbon cracking reactor (not shown) to regenerator 4 via spent catalyst line 4. The spent catalyst swirls around the interior of regenerator 2 in a tangential motion. A dilute fluidized bed forms in the upper part of regenerator 2 and a dense fluidized bed forms in the lower region of the regenerator. As the catalyst comes into contact with the oxygen in the incoming feed gas, the coke on the surfaces of the catalyst ignites and burns, thus producing combustion gases containing carbon dioxide, carbon monoxide, water vapor, nitrogen oxides, and probably sulfur oxides.

The total oxygen content of the gas entering regenerator 2 is insufficient to convert all of the coke to carbon dioxide, i.e. regenerator 2 is operated in a partial combustion mode. However, the incoming feed gas is rich enough in oxygen to cause substantial quantities of the reduced nitrogen in the coke compounds to convert to nitrogen oxides. If the incoming feed gas were less concentrated in oxygen, some of the coke nitrogen would be converted to reduced nitrogen compounds, such as ammonia. The reduced nitrogen compounds would be converted to nitrogen oxides in the highly oxidizing environment of the carbon monoxide boiler located downstream of regenerator 2.

The combustion gases rapidly rise to the top of regenerator 2 and enter reducing zone 14, wherein the concentration of carbon monoxide is sufficiently high to create a reducing environment. Most or all of the nitrogen oxides in the exhaust gas are converted to elemental nitrogen as the gas passes through reducing zone 14. The combustion gases next enter carbon monoxide boiler 22, if this equipment is used in the system. The exhaust gas leaving boiler 22, now comprised substantially of carbon dioxide and, perhaps nitrogen, leaves the system through vent line 24. As the gases pass through boiler 22, the carbon monoxide in the exhaust gas is converted to carbon dioxide, but little if any further oxidation of the nitrogen in the exhaust gas takes place. Thus, by virtue of the invention, some of the reduced nitrogen compounds that would otherwise be converted to nitrogen oxides in the system are converted to the more stable elemental nitrogen.

FIGS. 3 and 4 illustrate a preferred embodiment of the invention. In this embodiment, auxiliary oxygen distributor 26 is positioned in the upper part of combustion zone 12a, above oxygen distributor 18. Distributor 26 is provided with oxygen supply line 28 and nozzles 30.

In the operation of the process of the invention in the embodiment of FIGS. 3 and 4, spent catalyst enters regenerator 2 in the manner described above. A supply of oxygen-containing gas enters regenerator 2 through line 16. This gas is an oxygen-inert gas mixture. It may be air, oxygen-enriched air, oxygen-carbon dioxide or a mixture of oxygen and other inert gas(es), such as oxygen-argon gas mixture or oxygen-enriched air-carbon dioxide gas mixture.

A second supply of oxygen-containing gas is introduced into combustion zone 12a through line 28, distributor 26 and nozzles 30. This gas may be substantially pure oxygen, i.e. oxygen containing no more than about 1% of other gases; or high purity oxygen, i.e. gas containing at least about 80%, and preferably at least about 90% oxygen; or oxygen-enriched air. The purpose of the gas entering combustion zone 12a through distributor 26 is to enhance the oxidizing environment in combustion zone 12a. This will ensure a more complete conversion of coke nitrogen to intermediate nitrogen oxides, and thus more ultimate conversion of coke nitrogen to elemental nitrogen. The combustion gases leaving zone 12a pass through reducing zone 14 and optional carbon monoxide boiler 22 in the manner described above.

It will be appreciated that it is within the scope of the present invention to utilize conventional equipment to monitor and automatically regulate the flow of gases within the system so that it can be fully automated to run continuously in an efficient manner.

Although the invention has been described with particular reference to a specific experiment, this experiment is merely exemplary of the invention and variations are contemplated. For example, the process of the invention may be practiced in equipment arrangements other than those illustrated in the drawings, and the invention may be applied to systems other than FCC systems, such as fixed bed systems. The scope of the invention is limited only by the breadth of the appended claims.

What is claimed is:

1. A process for regenerating a hydrocarbon cracking catalyst having reduced nitrogen species-containing coke deposits thereon in a catalyst regeneration vessel comprising a combustion zone and a reducing zone comprising the steps:

(a) contacting said catalyst with an oxygen-inert gas mixture in said combustion zone at an average temperature in the range of about 650 to about 815° C., the oxygen introduced into said combustion zone constituting at least about 24% of said mixture and said mixture being introduced into said combustion zone independently of said hydrocarbon cracking catalyst, thereby combusting at least part of said coke and effecting conversion of at least part of the reduced nitrogen species in the coke to nitrogen oxides to produce a substantially oxygen-free combustion gas comprising carbon dioxide, nitrogen oxides and at least about 1% carbon monoxide; and (b) passing said combustion gas through said reducing zone, thereby converting most of said nitrogen oxides to elemental nitrogen.

2. A process for regenerating a hydrocarbon cracking catalyst having reduced nitrogen species-containing coke deposits thereon in a catalyst regeneration vessel comprising a combustion zone and a reducing zone comprising the steps:

(a) contacting said catalyst with first and second oxygen-containing gas streams in said combustion zone at an average temperature in the range of about 650 to about 815° C., the oxygen being introduced into said combustion zone constituting at least about 24% of the total gas entering said combustion zone, said first oxygen-containing gas stream consisting of air or oxygen-enriched air, and said second oxygen-containing gas stream comprising oxygen-enriched air or substantially pure oxygen thereby combusting at least part of said coke and effecting conversion of at least part of said reduced nitrogen species to nitrogen oxides to produce a substantially oxygen-free combustion gas comprising carbon dioxide, nitrogen oxides and at least about 1% carbon monoxide; and (b) passing said combustion gas through said reducing zone, thereby converting at least part of the nitrogen oxides in said combustion gas to elemental nitrogen.

3. The process of claim 1 or claim 2, wherein said catalyst is in the fluidized state.

4. The process of claim 3, wherein said regenerator vessel has an upper part and a lower part and said combustion zone is located in said lower part and said reducing zone is located downstream of said combustion zone.

5. The process of claim 4, wherein said catalyst is cycled between said regeneration vessel and a hydrocarbon cracking reactor vessel.

6. The process of claim 5, wherein said catalyst is selected from the group consisting of type X zeolites, type Y zeolites and mixtures of these.

7. The process of claim 1 or claim 2, wherein said combustion gas contains at least about 3% carbon monoxide.

8. The process of claim 1, wherein said oxygen-inert gas mixture contains at least about 25.5% oxygen.

9. The process of claim 8, wherein said combustion gas contains at least about 3.5% carbon monoxide.

10. The process of claim 1 or claim 2, wherein said combustion gas is subjected to a combustion step in which substantially all of the carbon monoxide in said combustion gas is converted to carbon dioxide.

11. The process of claim 10, wherein said combustion step is carried out in a carbon monoxide boiler.

12. The process of claim 10, wherein at least part of the carbon monoxide in said combustion gas is converted to carbon dioxide by water-gas shift reaction.

13. The process of claim 1, wherein said oxygen-inert gas mixture entering said combustion zone comprises oxygen and a gas selected from nitrogen, carbon dioxide or mixtures of these.

14. The process of claim 1 or claim 13, wherein oxygen is introduced into said combustion zone in first and second feed streams.

15. The process of claim 14, wherein said first feed stream is air or oxygen-enriched air.

16. The process of claim 14, wherein said second feed stream is oxygen-enriched air or substantially pure oxygen.

17. The process of claim 16, wherein said second feed stream is introduced into said regeneration vessel at one or more points in an upper region of said combustion zone.

18. The process of claim 2, wherein said oxygen being introduced into said combustion zone constitutes at least 25.5% of the total gas introduced into said combustion zone.

* * * * *